(12) United States Patent
Hsieh

(10) Patent No.: US 7,817,586 B2
(45) Date of Patent: Oct. 19, 2010

(54) HIGH-SPEED DIGITAL INTERFACE TRANSCEIVER AND METHOD OF SUPPLYING BI-DIRECTIONAL COMMUNICATION PROCESS ON HIGH-SPEED DIGITAL INTERFACE DEVICE

(75) Inventor: Kun-Li Hsieh, Pingtung County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 672 days.

(21) Appl. No.: 11/839,543

(22) Filed: Aug. 16, 2007

(65) Prior Publication Data
US 2009/0046690 A1 Feb. 19, 2009

(51) Int. Cl.
*H04B 1/44* (2006.01)
(52) U.S. Cl. ............................ 370/282; 398/138
(58) Field of Classification Search .............. 370/282, 370/278, 419, 463, 535; 398/67, 72, 128, 398/130, 138, 140
See application file for complete search history.

(56) References Cited

U.S. PATENT DOCUMENTS 7,706,692 B2 * 4/2010 Tatum et al. ............... 398/139
2007/0220150 A1 * 9/2007 Garg ............................ 709/226

* cited by examiner

*Primary Examiner*—Brenda Pham
(74) *Attorney, Agent, or Firm*—Winston Hsu; Scott Margo; Min-Lee Teng

(57) ABSTRACT

A high-speed digital interface (HSDI) transceiver with bi-directional HSDI function includes a transmitter, a receiver, a first multiplexer, and a controller. The first multiplexer is selectively coupled to the transmitter or the receiver in order to let the HSDI transceiver act as a source device or a sink device respectively. The controller is coupled to the first multiplexer for controlling a switching operation of the first multiplexer. When the HSDI transceiver is connected to an HSDI source device, the controller controls the first multiplexer to couple to the receiver to let the HSDI transceiver act as the sink device, and when the HSDI transceiver is connected to an HSDI sink device, the controller controls the first multiplexer to couple to the transmitter to let the HSDI transceiver act as the source device.

18 Claims, 6 Drawing Sheets

HIGH-SPEED DIGITAL INTERFACE TRANSCEIVER AND METHOD OF SUPPLYING BI-DIRECTIONAL COMMUNICATION PROCESS ON HIGH-SPEED DIGITAL INTERFACE DEVICE

BACKGROUND

The invention relates to a high-speed digital interface (HSDI) structure, and more particularly, to a bi-directional HSDI transceiver and method of supplying bi-directional communication process on the HSDI structure.

The HSDI structure, such as High-Definition Multimedia Interface (HDMI), is a digital audio/video interface capable of transmitting uncompressed data streams. HSDI is compatible with Digital Rights Management technology and provides an interface between any compatible digital audio/video source device (e.g. a set-top box, a DVD recorder, or a PC) and a compatible digital audio/video sink device, such as a digital television. Therefore, it has become a modern replacement for conventional analog standards such as SCART or RCA connectors.

In general, the channel for transmitting Transition Minimized Differential Signaling (TMDS) signals between the HSDI source device and the HSDI sink device is unidirectional, and data can only be transmitted from the source device to the sink device. Hence, applications of the HSDI standard, such as HDMI standard, are limited and not flexible. For example, a DVD recorder is not able to receive TV signals through a digital television when recording TV programs since the DVD recorder is a source device and the digital television is a sink device. The DVD recorder must be provided with a tuner to process the TV signals instead of utilizing the tuner inside the digital television. This inflexible characteristic of conventional HSDI devices is directly related to the increased production costs of the DVD recorder, such as the production cost of the tuner.

SUMMARY

One objective of the invention is therefore to provide a bi-directional HSDI transceiver and a method for supplying a bi-directional communication process on a HSDI device, to solve the above-mentioned problems.

According to an exemplary embodiment of the invention, an HSDI transceiver comprises a transmitter; a receiver; a first multiplexer, for selectively coupling to the transmitter or the receiver, wherein the first HSDI transceiver acts as a source device while the first multiplexer is coupled to the transmitter, and the first HSDI transceiver acts as a sink device while the first multiplexer is coupled to the receiver; and a controller, coupled to the first multiplexer, for controlling a switching operation of the first multiplexer, wherein the first HSDI transceiver is acted as a bi-directional communication device to support both functions of the source device and the sink device, and the first HSDI transceiver is pre-set to be either the source device or the since device prior generating a first control switching command.

According to an exemplary embodiment of the invention, a method for supplying a bi-directional communication process on a HSDI device comprises: utilizing a first HSDI transceiver for transmitting and receiving; coupling an interface of the first HSDI transceiver to a transmitter or a receiver of the first HSDI transceiver for transmitting or receiving process, wherein the first HSDI transceiver acts as a source device if the interface is coupled to the transmitter, and the first HSDI transceiver acts as a sink device if the interface is coupled to the receiver. The first HSDI transceiver is acted as a bi-directional communication device to support both functions of the source device and the sink device, and the first HSDI transceiver is pre-set to be either the source device or the sink device prior receiving or generating a first control switching command.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
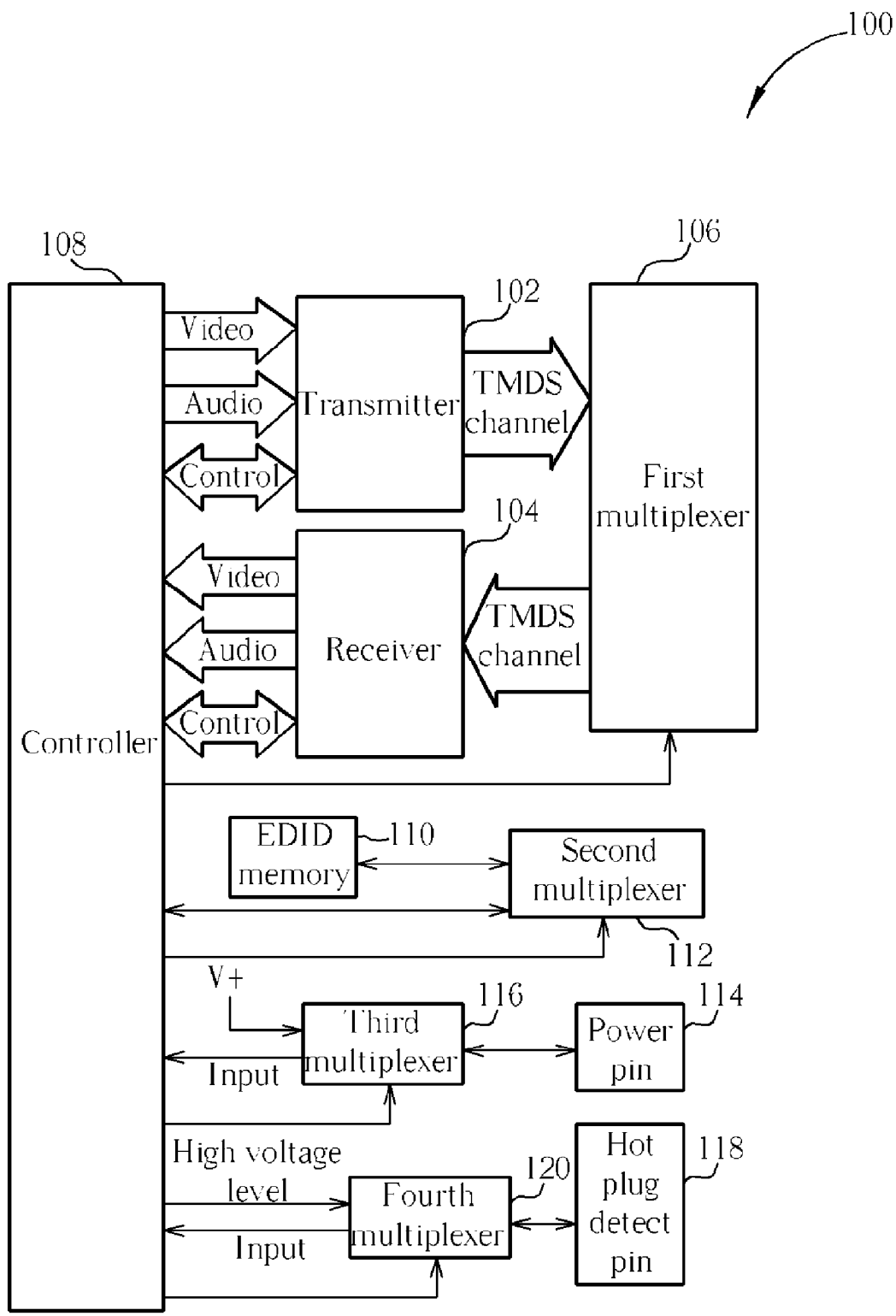
FIG. 1 is a diagram of an HSDI transceiver with bi-directional functionality according to an exemplary embodiment of the invention.

FIG. 1 illustrates a diagram of an HSDI transceiver with bi-directional HSDI functionality according to an exemplary embodiment of the invention. The HSDI transceiver 100 comprises a transmitter 102, a receiver 104, a first multiplexer 106, a controller 108, an enhanced extended display identification data (EDID) memory 110, a second multiplexer 112, a power pin 114, a third multiplexer 116, a hot plug detect pin 118 and a fourth multiplexer 120. The transmitter 102 is for transmitting a data stream, and is substantially the same as a transmitter in a conventional HSDI source device. The receiver 104 is for receiving a data stream, and is substantially the same as a receiver in a conventional HSDI sink device. The first multiplexer 106 is controlled by the controller 108 to be selectively coupled to the transmitter 102 or the receiver 104 to let the HSDI transceiver 100 act as a source device or a sink device respectively. That is, the transmitter 102 and the receiver 104 will not work at the same time in this embodiment. The EDID memory 110 is for storing EDID, including the data format or resolution that the HSDI transceiver 100 can support. The EDID in this embodiment can further include an identifying byte to represent whether the HSDI transceiver 100 supports the novel bi-directional functionality and whether the HSDI transceiver 100 acts as a source or sink device. The identifying byte will be described in detail in the following paragraphs. The second multiplexer 112, coupled to the EDID memory 110 and the controller 108, is controlled by the controller 108 to be selectively coupled to the EDID memory 110 or coupled to the controller 108.

Being bi-directional, the HSDI transceiver 100 can be chosen to act as a source device or a sink device depending on the user's requirement. Please note, prior generating a switching command, each HSDI transceiver 100 is pre-set as the source device or the sink device by having some default setting. For example, the settings of the power pin 114 and the hot plug detect pin 118, and the connection relationships of the first multiplexer 106 and the second multiplexer 112 of the HSDI transceiver 100 are pre-set to let the HSDI transceiver 100 conform to the standard for HSDI device, such as HDMI specification. When the HSDI transceiver 100 is a DVD recorder, the default setting of the first multiplexer 106 is to couple to the transmitter 102, the default setting of the second multiplexer 112 is to couple to the controller 108, the controller 108 controls the third multiplexer 116 to set the power pin 114 to supply power, and controls the fourth multiplexer 120 to set the hot plug detect pin 118 to become an input node.

When the HSDI transceiver 100 is connected to a specific HSDI device, it will trigger the detection process to determine whether the specific HSDI device is plugged in according to a communication procedure specified in the specification for a variety of HSDI devices, such as HDMI. Since such a communication procedure can be appreciated by a person skilled in this art, the detailed description is omitted here for the brevity. While both HSDI transceiver 100 and the specific HSDI device act as the same type of devices, which could be either both are source or both are sink devices, the HSDI transceiver 100 is unable to detect the plugged-in specific HSDI device. In such case, the controller 108 of the HSDI transceiver 100 could make transceiver 100 to be the sink device while the specific HSDI device is a source device and vice versa by controlling the first multiplexer 106, the second multiplexer 112, the third multiplexer 116, and the fourth multiplexer 118 to make the HSDI transceiver 100 act as the source device and the sink device alternately. Please note that controlling could be performed prior of the specific HSDI device is able to communicate with the HSDI transceiver 100. For example, if the HSDI transceiver 100 acts as a source device initially and the specific HSDI device is also a source device, the controller 108 controls the first multiplexer 106 to be coupled to the receiver 104, the second multiplexer 112 to be coupled to the EDID memory 110, the third multiplexer 116 to make the power pin 114 to draw power from the specific HSDI device, and the fourth multiplexer 120 to make the hot plug detect pin 118 to have a high voltage in order to let the HSDI transceiver 100 enter a slave mode to act as a sink device. By switching HSDI transceiver 100 to a sink device, two HSDI communication devices are able to communicate with each other after the HSDI transceiver 100 enters the slave mode. While the non-detection of plug-in status occurs due to the reason of the specific HSDI device is not connected to or not completely connected to the HSDI transceiver 100 yet, the HSDI transceiver 100 could switch to a master mode to act as the source device.

Once the HSDI transceiver 100 detects the plugged-in specific HSDI device, the controller 108 sends out a checking command to check whether the specific HSDI device supports the bi-directional HSDI functionality. Note that no matter whether the HSDI transceiver 100 is a source device or a sink device, it can actively send the checking command to another HSDI device through a wireless transmission or through a CEC line. The checking command can be an operation code (OP code) plus a parameter. Alternatively the controller 108 can check whether the specific HSDI device supports the bi-directional HSDI functionality by directly reading an identifying byte in the EDID memory of the specific HSDI device. For example, the specific HSDI device sets the parameter or the identifying byte to be '0' as not supporting the bi-directional functionality, or sets the parameter or the identifying byte to be '1' as supporting the bi-directional functionality in special position of EDID. Alternatively, the parameter or the identifying byte can be set to other identifications to represent whether the devices support the bi-directional functionality and the initial types of devices, such as the source or sink device. In addition, a HSDI device could choose to reply or not to reply an unknown command. If the HSDI transceiver 100 sends out the checking command and does not receive a response from the specific HSDI device, the specific HSDI device is deemed as a non-bi-directional HSDI transceiver and does not support the bi-directional functionality.

The following explains the operations of the HSDI transceiver 100 and the specific HSDI device for completely forming a bi-directional HSDI structure according to the status of the specific HSDI device.

Figure 2:
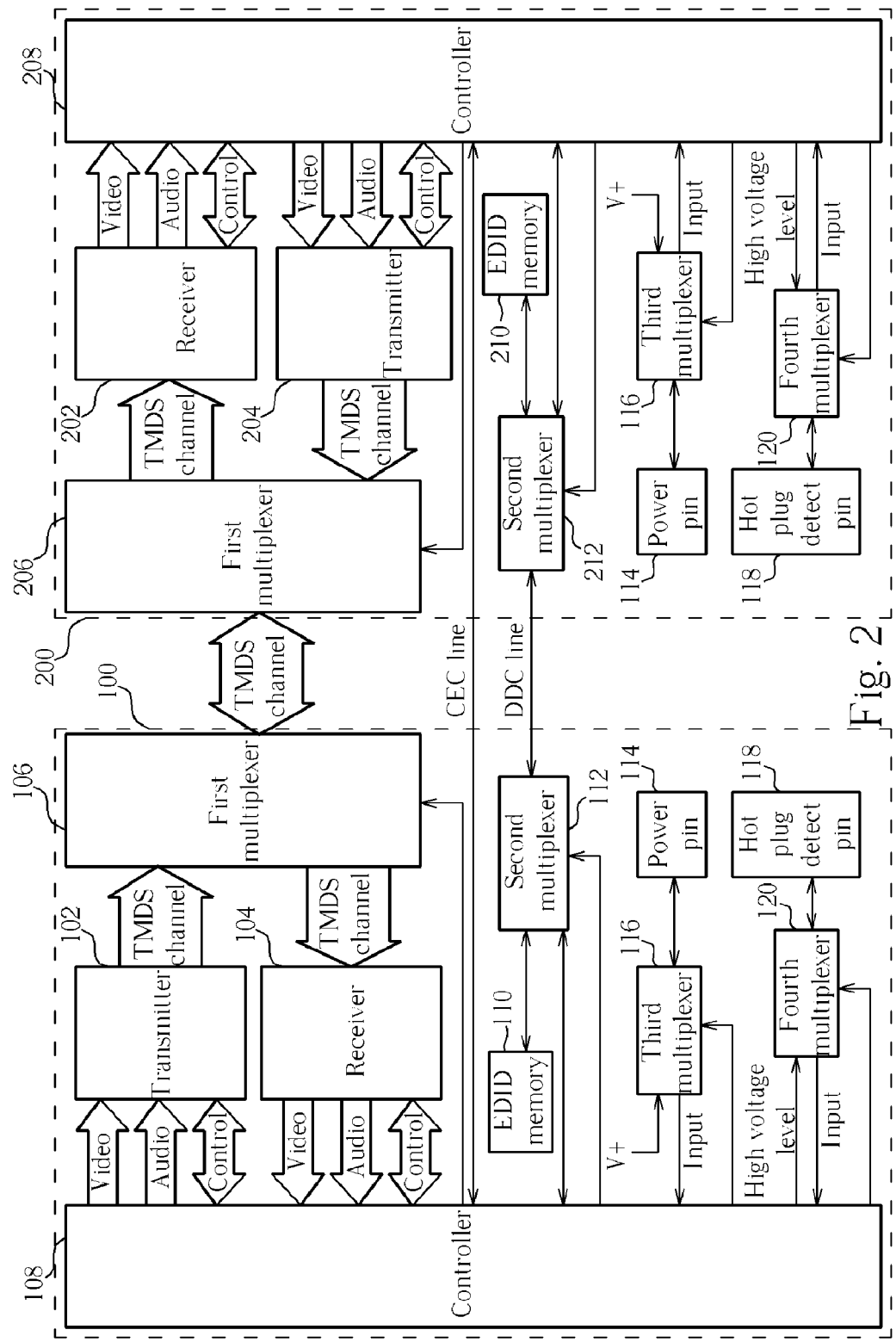
FIG. 2 is a diagram of a b-directional HSDI structure according to an exemplary embodiment of the invention.

If the specific HSDI device supports bi-directional functionalities, as shown in FIG. 2, the first multiplexer 106 of the HSDI transceiver 100 is connected to the first multiplexer 206 of the specific HSDI device 200 by a TMDS channel (or a wireless interface in another embodiment) to transport the HSDI signals bi-directionally between the HSDI transceiver 100 and the specific HSDI device 200, the controller 108 of the HSDI transceiver 100 is connected to the controller 208 of the specific HSDI device 200 by a CEC line (or a wireless interface), and the second multiplexer 112 of the HSDI transceivers 100 is connected to the second multiplexer 212 of the specific HSDI device 200 by a display data channel (DDC) line (or a wireless interface) to transport the EDID of the sink device. Initially, each device is set to be the default working function, source or sink function. When device is requested to change its working function, it needs to send the switching command to notify another device. For example, while the HSDI transceiver 100 is a source device and the specific HSDI device 200 is a sink device, initially the controller 108 of the HSDI transceiver 100 will control the first multiplexer 106 and the second multiplexer 112 to be source function; that is, coupling the first multiplexer 106 to the transmitter 102 and coupling the second multiplexer 112 to the controller 108 to let the HSDI transceiver 100 act as the source device. And initially the controller 208 of the HSDI transceiver 200 will control the first multiplexer 206 and the second multiplexer 212 to be sink function; that is, coupling the first multiplexer 206 to the receiver 202 and coupling the second multiplexer 212 to the EDID memory 210 to let the HSDI transceiver 200 act as the sink device.

When the HSDI transceiver 100 is requested to change its working function from source device to sink device, the HSDI transceiver 100 sends a checking command to the HSDI transceiver 200, and a first switching command is then sent from the controller 108 to the controller 208 of the specific HSDI device 200 through the CEC line, and if the controller 208 supports this first switching command, it should generate a second switching command in response to the first switching command and couple the first multiplexer 206 to the transmitter 204, couple the second multiplexer 212 to the controller 208, set hot-plug detect pin 218 to be input pin and set power pin 214 to be output pin. At this time, controller 108 will ignore the hot-plug in signal.

When the controller 108 receive the second switching command, the controller 108 will couple the first multiplexer 106 to the receiver 104, couple the second multiplexer 112 to the EDID memory 110, set the hot-plug detect pin 118 to be output pin and set power pin 114 to be input pin. Finally the HSDI transceiver 100 will set hot-plug signal to be high and the controller 208 will detect hot-plug in signal, then transceiver 200 will act as source device and the transceiver 100 will act as sink device. The switching command can be an OP code or an OP code plus some parameters. For example, the first switching command can be an OP code plus two parameters, the first parameter '1 ' or '0' represents that the device which receives command is requested to act as a source device or a sink device respectively. The second parameter is for confirming the operating resolution and frequency between the HSDI transceiver 100 and the specific HSDI device 200.

Figure 3:
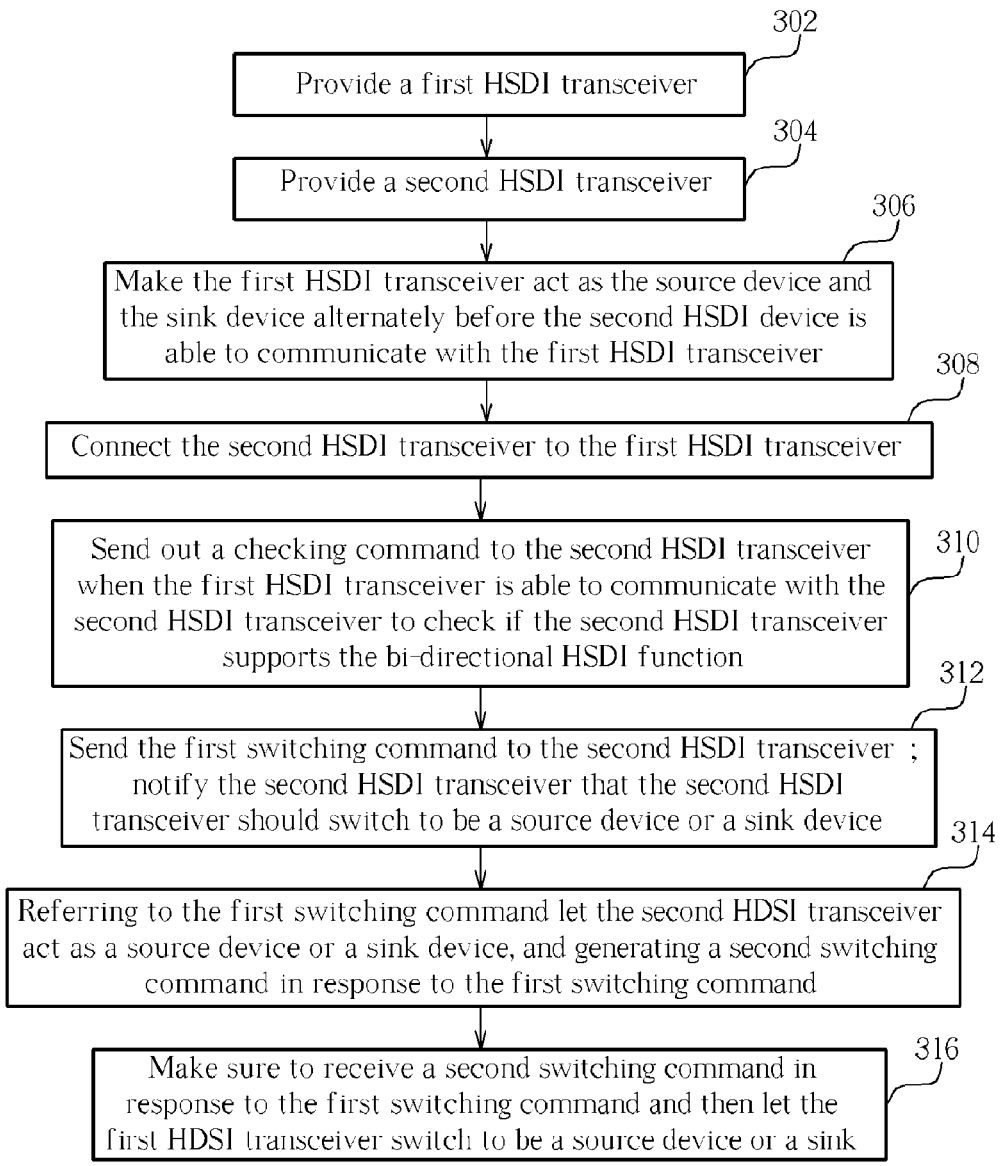
FIG. 3 is a flow chart of forming a bi-directional HSDI structure shown in FIG. 2.

FIG. 3 is a flow chart of forming a bi-directional HSDI structure shown in FIG. 2. As shown in FIG. 3, the method of forming the bi-directional HSDI structure comprises the following steps:

Step 302: Provide a first HSDI transceiver having a transmitter for transmitting a data stream, a receiver for receiving a data stream, and an EDID memory for storing an EDID of the first HSDI transceiver.

Step 304: Provide a second HSDI transceiver having a transmitter for transmitting a data stream, a receiver for receiving a data stream, and an EDID memory for storing an EDID of the second HSDI transceiver.

Step 306: Control the coupling operations of an input/output interface, a DDC interface, a power pin, and a hot plug detect pin of the first HSDI transceiver to make the first HSDI transceiver act as the source device and the sink device alternately before the second HSDI transceiver is able to communicate with the first HSDI transceiver.

Step 308: Connect the second HSDI transceiver to the first HSDI transceiver.

Step 310: Send out a checking command to the second HSDI transceiver when the first HSDI device is able to communicate with the second HSDI transceiver to check if the second HSDI transceiver supports the bi-directional HSDI function.

Step 312: Send a first switching command to the second HSDI transceiver and notify the second HSDI transceiver that the second HSDI transceiver should act as a source device or a sink device.

Step 314: Referring to the first switching command, selectively couple an input/output interface of the second HSDI transceiver to the transmitter or the receiver of the second HSDI transceiver to let the second HSDI transceiver act as the source device or the sink device respectively, and selectively couple a DDC interface of the second HSDI transceiver to the EDID memory of the second HSDI transceiver when the second HSDI transceiver acts as the sink device, or couple to the controller when the HSDI transceiver acts as the source device. And then, the second HSDI transceiver generates a second switching command in response to the first switching command.

Step 316: Receiving the second switching command, selectively couple an input/output interface of the first HSDI transceiver to the transmitter or the receiver of the first HSDI transceiver to let the first HSDI transceiver act as a source device or a sink device respectively, and selectively couple a DDC interface of the first HSDI transceiver to the EDID memory of the first HSDI transceiver when the first HSDI transceiver acts as the sink device, or to a controller of the first HSDI transceiver when the first HSDI transceiver acts as the source device.

Figure 4:
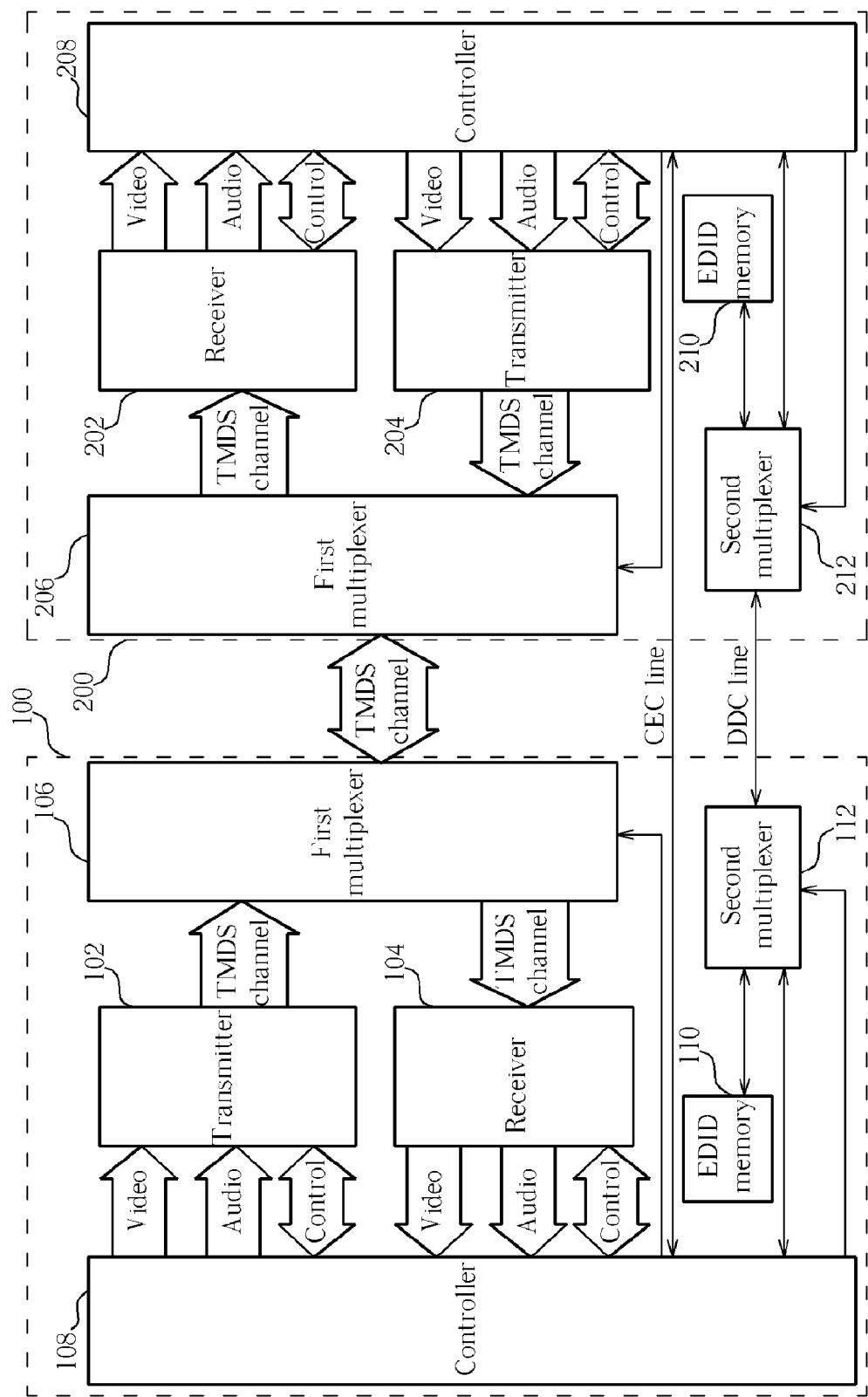
FIG. 4 is a diagram of a bi-directional HSDI structure according to another exemplary embodiment of the invention.

However, when the HSDI transceiver 100 or the bi-directional HSDI structure is implemented in a wireless transmission environment, the plug in process utilized to establish a connection between the HSDI transceiver 100 and the specific HSDI transceiver 200 can be carried out by communication protocols commonly used in wireless transmissions, such as the handshaking protocol. In this situation, the third multiplexer, the power pin, the fourth multiplexer and the hot plug detect pin are optional components and can be omitted. FIG. 4 shows a bi-directional HSDI structure of this embodiment. The bi-directional HSDI structure of FIG. 4 still provides bi-directional HSDI functionality by appropriately controlling the first multiplexers 106 and 206, and the second multiplexers 1112 and 212.

Figure 5:
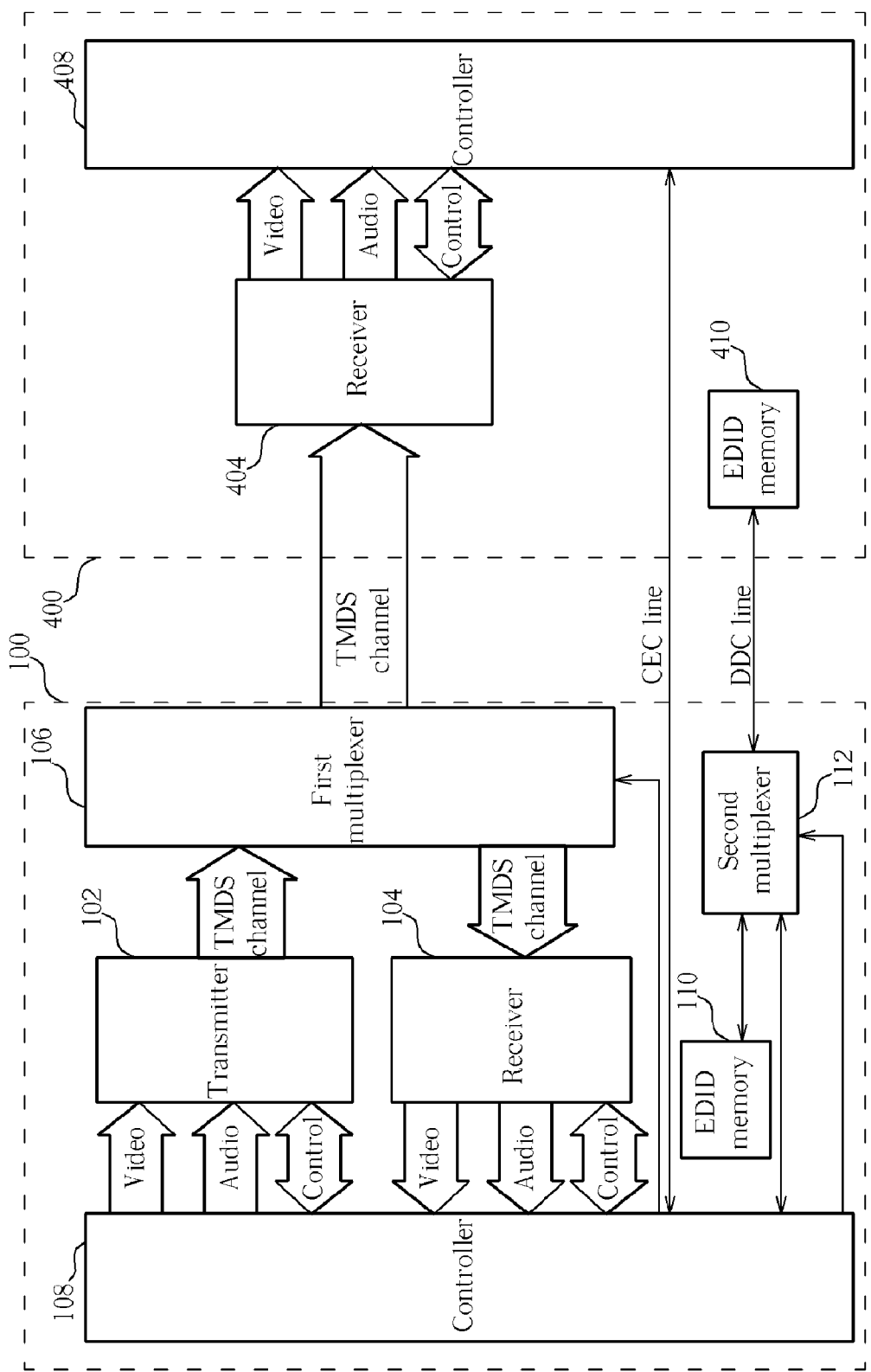
FIG. 5 is a diagram showing how an HSDI transceiver with bi-directional functionality connects an HSDI sink device according to an exemplary embodiment of the invention.

If, however, the specific HSDI device is not bi-directional and is a sink device, as shown in FIG. 5, the controller 108 of the HSDI transceiver 100 controls the first multiplexer 106 to couple to the transmitter 102 and the second multiplexer 112 to couple to the controller 108 to let the HSDI transceiver 100 act as the source device. The first multiplexer 106 is connected to the receiver 404 of the specific HSDI device 400 by a TMDS channel or a wireless interface to transport the HSDI signals from the HSDI transceiver 100 to the specific HSDI device 400, the controller 108 of the HSDI transceiver 100 is still connected to the controller 408 of the specific HSDI device 400 by a CEC line or a wireless interface, and the second multiplexer 112 of the HSDI transceiver 100 is connected to the EDID memory 410 of the specific HSDI device 400 by a DDC line or a wireless interface to read the EDID of the specific HSDI device 400.

Figure 6:
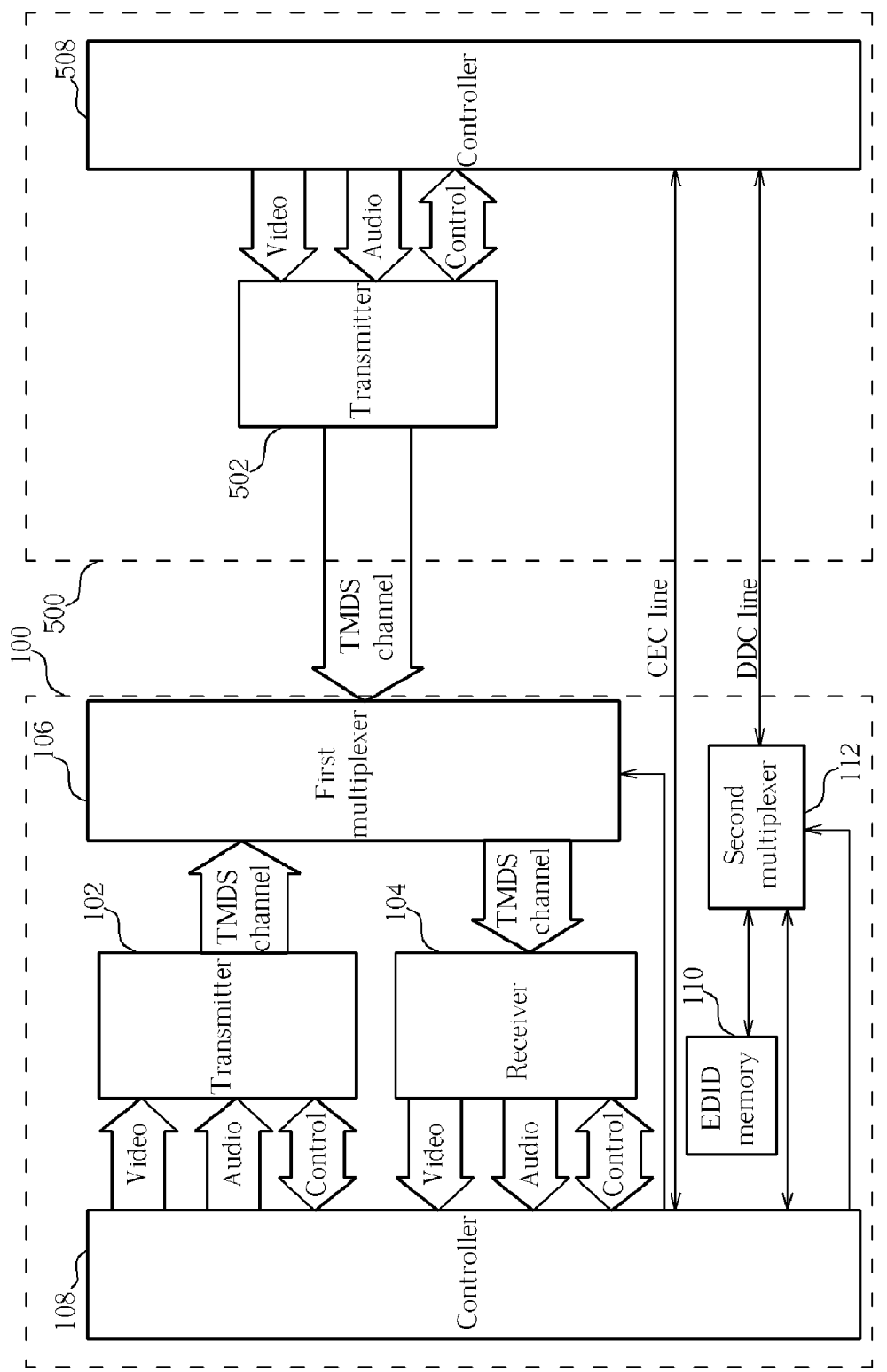
FIG. 6 is a diagram showing how an HSDI transceiver with bi-directional functionality connects an HSDI source device according to an exemplary embodiment of the invention.

Similarly, if the specific HSDI device is not bi-directional and is a source device, as shown in FIG. 6, the controller 108 of the HSDI transceiver 100 controls the first multiplexer 106 to couple to the receiver 104 and the second multiplexer 112 to couple to the EDID memory 110 to let the HSDI transceiver 100 act as the sink device. The first multiplexer 106 is connected to the transmitter 502 of the specific HSDI device 500 by a TMDS channel or a wireless interface to transport the HSDI signals from the specific HSDI device 500 to the HSDI transceiver 100, the controller 108 of the HSDI transceiver 100 is still connected to the controller 508 of the specific HSDI device 500 by a CEC line or a wireless interface, and the second multiplexer 112 of the HSDI transceiver 100 is connected to the controller 508 of the specific HSDI device 500 by a DDC line or a wireless interface to let the specific HSDI device 500 read the EDID of the HSDI transceiver 100. Note that in each of the aforementioned cases, the HSDI transceiver 100 will return to its default settings after the connection is terminated.

Briefly summarized, an HSDI transceiver with bi-directional functionality can switch its function to make itself compatible to a typical HSDI source device/HSDI sink device, or form a bi-directional HSDI structure coupled with another HSDI transceiver with bi-directional functionality. It can extend the combinations and the usage of the HSDI device applications. When a DVD recorder and a digital television both have bi-directional HSDI functionality, TV signals can be received and processed by the tuner in the digital TV and transformed into HSDI signals by the HSDI device in the digital TV. The HSDI signals are then transported to the DVD recorder as a video input and an audio input. In this way, the DVD recorder does not need to be provided with a tuner while recording a TV program. The cost of the DVD recorder is hence significantly decreased. Moreover, a user can use a mobile phone or a remote computer to control the computer at home through the Internet to turn on a TV and switch the HSDI device inside the TV to act as a source device. By utilizing the bi-directional structure of the TV and the computer at home, the TV can transport TV signals to the computer. Once the computer has transferred the HSDI TV signal into a TS bit stream, it can further transmit the TS bit stream to the user through the Internet, allowing the user to watch TV programs in any location.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first high-speed digital interface transceiver for transmitting or receiving high-speed data, wherein the high-speed digital interface transceiver comprises:
    a transmitter;
    a receiver;
    a first multiplexer for selectively coupling to the transmitter or the receiver, wherein the first high-speed digital interface transceiver acts as a source device while the first multiplexer is coupled to the transmitter, and the first high-speed digital interface transceiver acts as a sink device while the first multiplexer is coupled to the receiver; and
    a controller, coupled to the first multiplexer, for controlling a switching operation of the first multiplexer;
    wherein the first high-speed digital interface transceiver is acted as a bi-directional communication device to support both functions of the source device and the sink device, and the first high-speed digital interface transceiver is pre-set to be either the source device or the since device prior generating a first control switching command.

2. The transceiver of claim 1, wherein the first control switching command is received by a specific high-speed digital interface device other than the first high-speed digital interface transceiver, whereby the specific high-speed digital interface device is either a uni-directional communication device or a bi-directional communication device.

3. The transceiver of claim 2, wherein the controller of the first high-speed digital interface transceiver generates a first control switching command to detect whether a specific high-speed digital interface device is a uni-directional communication device or a bi-directional communication device, whether the specific high-speed digital interface device is the source device or the sink device, or whether the specific high-speed digital interface device is capable of supporting both functions of the source device and the sink device.

4. The transceiver of claim 2, wherein a controller of the specific high-speed digital interface device generates a second control switching command in response to the first control switching command.

5. The transceiver of claim 4, wherein the first high-speed digital interface transceiver acts as the source device if the second control switching command makes the first multiplexer to couple with the transmitter, and acts as the sink device if the second control switching command makes the first multiplexer to couple with the receiver.

6. The transceiver of claim 1, wherein the first multiplexer transmit or receive a data stream through a transition minimized differential signaling (TMDS) channel or a wireless interface.

7. The transceiver of claim 1, wherein the first switching command is transported through a consumer electronics control (CEC) line.

8. The transceiver of claim 1, wherein the first switching command is transported through a wireless interface.

9. The transceiver of claim 1, wherein the first high-speed digital interface transceiver further comprises:
    an enhanced extended display identification data (EDID) memory, for storing an EDID of the first high-speed digital interface transceiver; and
    a second multiplexer, selectively coupling to the EDID memory of the first high-speed digital interface transceiver when the first high-speed digital interface transceiver acts as the sink device, and coupling to the controller of the first high-speed digital interface transceiver when the first high-speed digital interface transceiver acts as the source device.

10. The transceiver of claim 9, wherein the EDID of the sink device is transported through a display data channel (DDC) line or a wireless interface.

11. The transceiver of claim 1, wherein the first high-speed digital interface transceiver further comprises:
    a power pin, coupled to the controller of the first high-speed digital interface transceiver, for supplying power to a specific high-speed digital interface device when the first high-speed digital interface transceiver acts as the source device, and being an input pin when the first high-speed digital interface transceiver acts as the sink device, wherein the power pin is controlled by the controller of the first high-speed digital interface transceiver.

12. The transceiver of claim 1, wherein the first high-speed digital interface transceiver further comprises:
    a hot plug detect pin, coupled to the controller of the first high-speed digital interface transceiver, being an input pin when the first high-speed digital interface transceiver acts as the source device, or to have high voltage when the first high-speed digital interface transceiver acts as the sink device.

13. The transceiver of claim 1, wherein the controller reads an enhanced extended display identification data (EDID) of a specific high-speed digital interface device when the first high-speed digital interface transceiver is connected to the specific high-speed digital interface device to check if the specific high-speed digital interface device supports both functions of the source device and the sink device.

14. The transceiver of claim 13, wherein information of checking if the specific high-speed digital interface device supports both function of the source device and sink device is stored in an EDID memory of the specific high-speed digital interface device.

15. A method for supplying a bi-directional communication process on a high-speed digital interface device, comprising:
    utilizing a first high-speed digital interface transceiver for transmitting and receiving; and
    coupling an interface of the first high-speed digital interface transceiver to a transmitter or a receiver of the first high-speed digital interface transceiver for transmitting or receiving process, wherein the first high-speed digital interface transceiver acts as a source device if the interface is coupled to the transmitter, and the first high-speed digital interface transceiver acts as a sink device if the interface is coupled to the receiver;
    wherein the first high-speed digital interface transceiver is acted as a bi-directional communication device to support both functions of the source device and the sink device, and the first high-speed digital interface transceiver is pre-set to be either the source device or the sink device prior receiving or generating a control switching command.

16. The method of claim 15, further comprising:
making the first high-speed digital interface transceiver to be the source device and the sink device according to the control switching command, whereby the control switching command is generated from a specific high-speed digital interface device other than the first high-speed digital interface transceiver; and
connecting the interface of the first high-speed digital interface transceiver and the interface of the specific high-speed digital interface device to each other for communicating the first high-speed digital interface transceiver and the specific high-speed digital interface device bi-directionally through a cable or wirelessly.

17. The method of claim 15, wherein the step of utilizing the first high-speed digital interface transceiver further comprises:

utilizing an enhanced extended display identification data (EDID) memory for storing an EDID of the first high-speed digital interface transceiver; and coupling a display data channel (DDC) interface of the first high-speed digital interface transceiver to the EDID memory of the first high-speed digital interface transceivers when the first high-speed digital interface transceivers acts as the sink device, and coupling the DDC interface of the first high-speed digital interface transceiver to a controller of the first high-speed digital interface transceivers when the first high-speed digital interface transceiver acts as the source device.

18. The method of claim 16, further comprising transporting an EDID of the sink device between the first high-speed digital interface transceiver and the specific high-speed digital interface device through a display data channel (DDC) line or a wireless interface.

* * * * *